United States Patent
Belton, Jr. et al.

(10) Patent No.: US 9,967,742 B1
(45) Date of Patent: May 8, 2018

(54) WIRELESS MULTI-FACTOR AUTHENTICATION WITH CAPTIVE PORTALS

(71) Applicant: Wells Fargo Bank, N.A., Charlotte, NC (US)

(72) Inventors: Lawrence T. Belton, Jr., Charlotte, NC (US); Brian Beaty, Waxhaw, NC (US); Timothy H. Morris, Lexington, NC (US); Douglas S. Rodgers, Mooresville, NC (US); Lynn Allen Smith, Statesville, NC (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 252 days.

(21) Appl. No.: 14/707,783

(22) Filed: May 8, 2015

Related U.S. Application Data

(63) Continuation of application No. 13/584,406, filed on Aug. 13, 2012, now Pat. No. 9,088,891.

(51) Int. Cl.
*H04W 12/06* (2009.01)
*H04W 12/08* (2009.01)
*H04L 29/06* (2006.01)

(52) U.S. Cl.
CPC ............ *H04W 12/06* (2013.01); *H04L 63/08* (2013.01); *H04W 12/08* (2013.01)

(58) Field of Classification Search
USPC ........................................................ 280/483
See application file for complete search history.

(56) References Cited

U.S. PATENT DOCUMENTS

| | | |
|---|---|---|
| 7,263,076 B1 | 8/2007 | Leibovitz et al. |
| 7,450,940 B2 | 11/2008 | Myers et al. |
| 7,555,783 B2 | 6/2009 | Enright |
| 7,590,684 B2 | 9/2009 | Herrmann |
| 7,730,527 B2 | 6/2010 | Charles et al. |
| 7,788,703 B2 | 8/2010 | Jou et al. |
| 7,810,138 B2 | 10/2010 | Vank et al. |
| 7,814,322 B2 | 10/2010 | Gurevich et al. |
| 8,028,329 B2 | 9/2011 | Whitcomb |
| 8,051,464 B2 | 11/2011 | Cheeniyil et al. |

(Continued)

OTHER PUBLICATIONS

Aruba Networks Retail Wireless Networks Validated Reference Design; Aruba Networks, Inc.; 2008; http://www.arubanetworks.com/pdf/technology/DG_Retail_Wireless.pdf.

(Continued)

*Primary Examiner* — Jeffrey Pwu
*Assistant Examiner* — Samuel Ambaye
(74) *Attorney, Agent, or Firm* — Walter | Haverfield LLP; James J. Pingor

(57) ABSTRACT

Systems and methods for device-agnostic, multi-factor network authentication are disclosed. In some embodiments, a wireless network connection can authenticate a device over secure authentication means with a certificate that confirms a device identity. After authenticating the device, a user can be prompted to provide credentials in a captive portal. The captive portal can be inaccessible to devices that have not already authenticated using a certificate. After providing approved credentials to the captive portal, the user can access the network. This embodiment and additional embodiments are readily integrated into private wireless networks and others.

17 Claims, 8 Drawing Sheets

(56) References Cited

U.S. PATENT DOCUMENTS

| | | |
|---|---|---|
| 2004/0010713 A1 | 1/2004 | Vollbrecht et al. |
| 2006/0075467 A1 | 4/2006 | Sanda et al. |
| 2006/0195893 A1 | 8/2006 | Caceres et al. |
| 2009/0116703 A1* | 5/2009 | Schultz .................. G06F 21/32 382/118 |
| 2009/0158032 A1 | 6/2009 | Costa et al. |
| 2010/0151818 A1 | 6/2010 | Miller et al. |
| 2011/0004918 A1 | 1/2011 | Chow et al. |
| 2011/0154454 A1 | 6/2011 | Frelechoux |
| 2011/0239278 A1* | 9/2011 | Downey ............... H04L 63/083 726/4 |
| 2011/0277025 A1* | 11/2011 | Counterman ........... G06F 21/40 726/8 |
| 2011/0302643 A1* | 12/2011 | Pichna ................ H04L 63/0892 726/7 |
| 2012/0045060 A1 | 2/2012 | Maestrini et al. |

OTHER PUBLICATIONS

Ruckus Wireless Awarded Wi-Fi Security Patent for Dynamic Authentication and Encryption; May 24, 2010; http://www.ruckuswireless.com/press/releases/20100524-dynamic-psk-patent.
Ruckus Wireless Makes Big Move to Small Cells; Feb. 27, 2012; http://www.ruckuswireless.com/press/releases/20120227-big-move-to-small-cells.

* cited by examiner

WIRELESS MULTI-FACTOR AUTHENTICATION WITH CAPTIVE PORTALS

CROSS REFERENCE

This application is a continuation of, and claims priority to, U.S. patent application Ser. No. 13/584,406, filed Aug. 13, 2012, and entitled "WIRELESS MULTI-FACTOR AUTHENTICATION WITH CAPTIVE PORTAL," the entirety of which is expressly incorporated herein by reference.

TECHNICAL FIELD

This disclosure relates generally to data processing systems and, more particularly, to authenticating endpoints utilizing wireless network connections.

BACKGROUND

Recent devices in the electronics market changed the network security landscape. The increasing prevalence of portable network-focused devices such as tablets and WiFi-capable (e.g., 802.11 capable) mobile telephones has increased the difficulty of securing wireless networks. Different devices can run a variety of operating systems, each with their own settings and capabilities, and can be difficult to identify and manage as an administrator due to their portability. It is no longer sufficient to only account for a few machine types and operating systems when developing a network access control plan.

The addition of wireless-only devices adds another layer of complexity to the control architecture. While several security algorithms exist in standard wireless networks, most depend on static keys that can be easily compromised and do nothing to facilitate unique identification of a connecting entity. Some network management components can seek to establish the identity of a connecting entity, but where the device itself furnishes information, false information can be presented. In this regard, wireless connections are ripe for exploitation by malicious entities, as unencrypted transmissions can be monitored over the air to discover information about identities on the network.

Guest networks permit roaming users to access the internet, but generally lack the security desired for networks with access to internal files or proprietary information. Further, guest networks can be inefficient, easily abused, and pose additional risks avoided by secure networks. Thus, it is appreciable that guest networks are, at best, an inelegant solution to permit some degree of access for mobile devices.

Accordingly, there is a need to identify machines that can be managed on secure networks and allow access to users employing a greater number and variety of devices.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

To address some of the deficiencies identified and to provide other advantages, one or more aspects and corresponding disclosures thereof relating to a multi-factor authentication for access to wireless networks are disclosed.

In one aspect, a device authentication is provided to confirm the identity of a device on a wireless network. In some embodiments, the device authentication precedes access to one or more additional authentication layers.

In another aspect a user authentication is provided to confirm the identity of a user on a wireless network. In further aspects, the user authentication is provided by a captive portal. In one or more additional aspects, the captive portal is inaccessible by the user until a different authentication is performed.

In some aspects, further means of wireless security and network access control can be employed in conjunction with the techniques described above.

In additional aspects, at least a primary, a secondary, and a tertiary secure tunnels can be employed throughout a multi-factor authentication. Additional secure tunnels can be employed depending on a number and type of factors.

In yet another aspect a means is provided that facilitates the afore-mentioned techniques.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
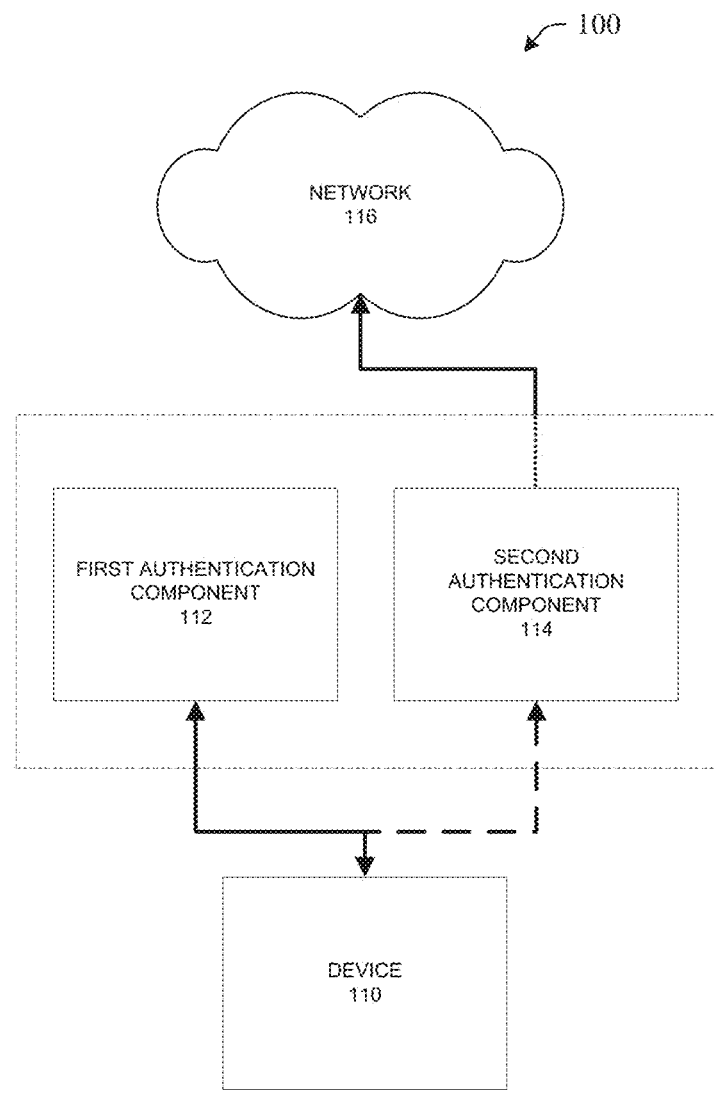
FIG. 1 illustrates a block diagram of a system employing a multi-factor wireless authentication for network access in accordance with some aspects described herein.

Systems and methods that employ multi-factor authentication over wireless communication can be used to increase communication security with a wide variety of devices including disparate proprietary device systems and subsystems. In one or more embodiments, a device can access a wireless network via an access point employing wireless security. Upon associating with the access point, the device can, for example, undergo a device authentication that confirms the device identity. Once the device is recognized as authorized for network access, a next factor in the multi-factor authentication can employ a captive portal that facilitates, for example, a user authentication. Network traffic not related to the captive portal can be restricted until a user provides his or her credentials. Upon approval of provided user credentials, the device and user can be granted access to the network. In some embodiments, other tests can be applied prior to granting access. While the multi-factor test is typically described herein with respect to two authentications (device and user), it is understood that some embodiments can employ three or more authentications to be pursued in alternate or combined orders. In at least one embodiment, the order of authentications can be reversed, for example, performing a user authentication before a device authentication. Those skilled in the art can understand, in view of the disclosures herein, that the types of authentication employed and the order of security procedures is flexible, and that other aspects described herein can supplement or replace those set forth in the example embodiment described above.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, known structures and devices are shown in block diagram form in order to facilitate describing these aspects.

As used in this application, the terms "component", "module", "system", and the like can be intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). It is intended to be understood that those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

As used herein, "standardized" or "standard" technologies are those in common use that accord with software, hardware, infrastructure, and other norms or specifications providing for interoperability. For example, the Institute of Electrical and Electronics Engineers (IEEE) 802.11 and 802.1X are standards that can be used in implementations related to some aspects herein. WPA-2 is a common wireless security technology that current devices equipped with wireless radios can employ. The World Wide Web Consortium (W3C) promulgates standards related to web designs and applications and other Internet-based technologies. Similarly, "generic" technologies as referred to herein are those which are device agnostic. A device agnostic technology is one that functions regardless of the operating system or device type on which it is used. Device agnostic technologies can be deployed as a single implementation that functions across all platforms (e.g., a simple cascading style sheet that presents no browser conflicts), or in a multiple implementation that provides modified information depending on the device (e.g., detect device and serve device-appropriate style sheet). As used herein, "proprietary" technologies are those specific to a device, platform or vendor/manufacturer. For example OS X™ includes proprietary features, some of which are, and some of which are not, interoperable with analogous features in Windows™. "Non-proprietary" technologies are those that are interoperable, and can often be standardized. "Resident" or "native" technologies can be proprietary or generic. "Embedded" technologies are those that travel with non-resident aspects being utilized on a device. The purpose of embedded technologies is to provide the necessary support or features where it is uncertain as to whether said support or features are available (resident) on the device.

Referring initially to FIG. 1, illustrated is a system 100 that employs a multi-factor authentication for network access. System 100 can include device 110, which can be, for example, a tablet, mobile phone, personal digital assistant (PDA), e-reader, netbook, music player, laptop computer, desktop computer, and others. System 100 can also include network 116. Network 116 can provide access to the Internet, an intranet, an extranet, other communication means using protocols that at least, in part, are used for the transfer of data (e.g., hypertext transfer protocol, file transfer protocol, simple mail transfer protocol, trivial file transfer protocol, simple file transfer protocol, network news transfer protocol), and/or combinations thereof. Network 116 can be available over wired and/or wireless connections. In some embodiments, network 116 can be a phone or cellular network, or a proprietary network capable of accepting additional device types. In other embodiments, network 116 can be or include a contact-less data sharing or communication means other than WiFi (e.g., infrared, BlueTooth™, other near-field communication techniques) employing a suitable form of access and traffic control management.

Various network access controls can be employed to limit device 110 from freely utilizing network 116. For example, where network 116 includes wireless access, wireless security can be employed to prevent unauthorized devices from associating with an access point connected to network 116. Wireless security can be effected by the access point or remotely through network 116. Examples of wireless security that can be employed include Wired Equivalent Privacy, WiFi Protected Access (WPA and WPA-2), Wireless Local Area Network (WLAN) Authentication and Privacy Infrastructure, 802.1X, and others. Access in accordance with wireless security can occur "automatically," as with saved or pre-configured credentials employed such that the user need not interact for their device to associate with an access point, or can require user entry of a credential (e.g., a non-saved, pre-shared key or 802.1X logon). Wireless security can be transmitted and received encrypted or unencrypted.

Network 116 can be protected by additional security or authentication aspects, such as those provided by first authentication component 112 and second authentication component 114. In some embodiments, first authentication component 112 can restrict communications traffic from device 110 until an authentication via first authentication component 112 is complete. Once device 110 authenticates with first authentication component 112, the device can be referred, restricted, or granted access to second authentication component 114. Thus, the solid line from device 110 to first authentication component 112 represents the only access assured to device 110 or any other device attempting to connect to network 116, as they will only reach and communicate with first authentication component 112 until providing acceptable authentication. The dashed line from device 110 to second authentication component 112 indicates a secondary link dependent upon satisfaction of authentication via the solid line route to first authentication component 112. Upon satisfying second authentication component 114, device 110 can access network 116, as indicated by the partially dotted line between second authentication component 114 and network 116.

In some embodiments, first authentication component 112 can be a device authentication. For example, first authentication component 112 can interrogate the device to determine that the device is permitted on the network. For example, a credential (e.g., digital certificate, secure token, stored key) can be provided by the device upon request. In some embodiments, the credential can be supplied without user interaction. In some embodiments, the credential can require user interaction to provide to first authentication component 112. Hybrid and alternative methods for presenting a device credential will be appreciated by those skilled in the art once familiar with the subject innovation.

In embodiments where a device is identified, device identification can range from general to unique. For example, a device can be identified as a particular make, model or version from an anonymous group of devices allowed on the network (e.g., identified as Windows™ tablet, all Windows™ tablets allowed). In another example, a device can be identified as belonging to a specific group allowed on the network without performing a unique identification (e.g., identified as an Android™ phone that has been approved to access the network among a group of Android™ phones, the group not including all such phones). In another example, a unique identification can occur (e.g., iPhone™ with a specific device identifier uniquely associated with that particular device). These examples are non-exclusive, and various implementations or embodiments can perform multiple types of identification on the same network depending on contextual issues.

If the device credential does not match one or more credentials recognized by first authentication component, the device can be disassociated or disconnected, temporarily (e.g., denied for a period of time) or permanently (e.g., at least requiring administrator intervention to re-allow).

If the device credential matches one or more credentials recognized by first authentication component 112, the device can attempt to authenticate via the second authentication component 114. In some embodiments, second authentication component 114 can be a user authentication. Some embodiments can employ a captive portal, where a user is only permitted to view communication traffic required for an authentication input until they enter user credentials authenticating the user. In at least one embodiment, the captive portal automatically displays after authentication via first authentication component 112. In at least one alternative embodiment, a separate aspect must be actuated by the user to display the captive portal. In some embodiments, a captive portal associated with second authentication component 114 utilizes an application, utility, and/or module (e.g., web browser, authentication dialog box, popup) native to the device to present the captive portal.

In some embodiment, a captive portal can be hosted as firmware or on a local device storage (e.g., through an access point or router). In alternative embodiments, a captive portal can be hosted on a dedicated server that is restricted from greater network access. In still other embodiments, the captive portal can be hosted on a non-dedicated server, but can remain accessible where other resources are not by use of multiple drives, partitions, permissions, user groups, address filtering, et cetera.

User credentials can be, for example, a username and password. In some embodiments, alternative or additional credentials such as digital certificates, personal identification numbers, encryption keys, physical or logical tokens, and others can be utilized. In some embodiments, a digital certificate can be an X.509 non-exportable certificate. In some embodiments, other types of certificates can be employed. Some such embodiments can employ a private key that is not permitted to move between devices.

If the user provides inappropriate or unrecognized user credentials to the captive portal associated with second authentication component 114, various embodiments can proceed to different results. For example, the user can have unlimited opportunities to provide accepted credentials. Alternatively, the user can have one or more, to a predetermined number, of opportunities to provide accepted credentials. The predetermined number of opportunities to provide accepted credentials can be variable, depending upon the device identity, location, previous history, time of day, and other contextual factors to determine how many failed attempts are acceptable. After the predetermined number of opportunities to provide acceptable credentials has passed, the system may disallow, temporarily or permanently, the device from re-accessing the captive portal, effectively removing the device from the possibility of establishing access to network 116 (e.g., at least for a period of time or until a condition is met). In some embodiments, the device can be rolled back to first authentication component 112 to re-authenticate after a maximum number of attempts is exceeded. In some embodiments, the device can be disassociated or disconnected from the access point upon exceeding the maximum number of second authentication attempts. The user can be notified of one or more failed attempts and provided additional prompts or password reset opportunities in various embodiments. Other options for dealing with one or more failed authentication attempts, in conjunction with any component or step herein, will be appreciated by those skilled in the art.

If the user provides an accepted user credential to second authentication component 114, device 100 has now been identified both by device identification and by user identification, accomplishing a robust multi-factor authentication (that can be in addition to any other wireless security in effect). Only after completing these authentication steps, in the prescribed order, can device 100 access network 116 in this particular embodiment.

Several techniques can be used for disconnecting and reconnecting in accordance with aspects herein. These techniques can involve, but are not limited to, storing credentials and repeating no, one or all steps. For example, on a relatively insecure network, a short interruption can facilitate automatic reconnection after just identifying the device again (e.g., user not required to re-authenticate if authenticated and device was off network for less than one minute). In a very secure network arrangement, all authentication steps can be repeated after any interruption or change in device status (e.g., very short disconnection, device configuration change). In between these options, credentials can be stored for a limited period of time, such that interruptions do not require re-authentication at a frequency greater than once per period of time. Other techniques and combinations for reestablishing connections will be appreciated by those with knowledge of this technical area.

The multi-factor authentication employed can be understood by referring to the computing analogy of the "walled garden." In some aspects related to the innovation, multiple walled gardens can be employed. First authentication component 112 only allows traffic within a first walled garden. Upon authentication using first authentication component 112, device 100 is not released from the walled garden, but rather granted access to a second walled garden representing second authentication component 114. After authenticating with second authentication component 114, device 110 has access beyond both walled gardens, to include network 116. Further controls (e.g., network permissions, user classes) can restrict device and user access beyond the walled gardens. This analogy remains accurate whether walled gardens associated with first authentication component 112 and second authentication component 114 are conceptualized as one walled garden within the other, connected walled gardens with a door between them, or completely separate entities.

In some embodiments, additional wireless security prevents access to the walled garden(s) in the first place. For example, WPA-2 wireless security can restrict device 110 from associating with an access point, thus preventing it from even entering the first walled garden unless the WPA-2 wireless security is satisfied. In some embodiments, WPA-2 wireless security can be utilized or combined with one or more of first authentication component 112, second authentication component 114, and others.

For purposes of brevity, the multi-factor authentication has been described with respect to two authentication components. However, in some embodiments, additional authentication components can be employed in conjunction with multi-factor authentication. Multi-factor authentication as disclosed herein is not limited to any particular number of authentication methods, and can employ three or more factors or challenges prior to permitting full access to network 116. In some embodiments, permissions for network 116 associated with a device or user can increase or decrease depending on the number of authentication factors or other contextual information (e.g., access point used for connection, type of device, convenience of authentication, visibility of keyboard or screen, other devices in area).

Figure 2:
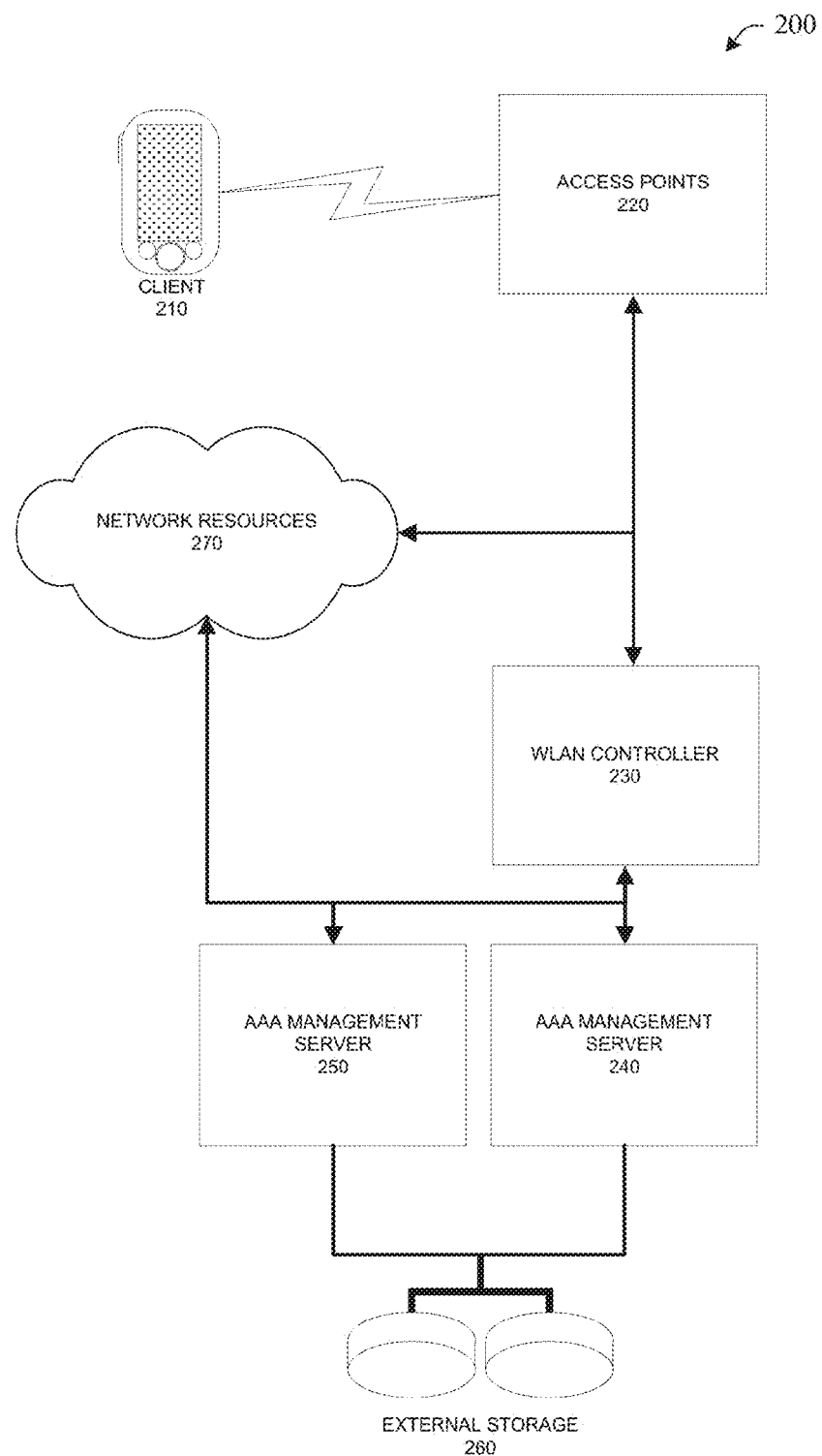
FIG. 2 illustrates a diagram of a system for accessing network resources in accordance with some aspects described herein.

Turning now to FIG. 2, illustrated is a diagram of a system 200 for accessing network resources in accordance with some aspects described herein. A client 210 desires access net network resources 270. In order to transmit and receive to and from network resources 270, client 210 must associate with one or more of access points 220. Access points 220 can be managed by WLAN controller 230. Access points 220 and/or WLAN controller 230 can provide wireless security in the form of, for example, WPA-2.

Upon associating with access points 220, client 210 can be restricted from accessing network resources 270 pending authentication, authorization and accounting (AAA) procedures. AAA can be managed by one or more of AAA management server 240 and AAA management server 250. In some embodiments, additional AAA management servers or other components can exist within system 200. AAA management server 240 and AAA management server 250 can access external storage 260 to employ databases in conjunction with authentication and other processes. In an embodiment, credential information from proprietary systems (e.g., Active Directory™ information) can be stored on external storage 260, and can be leveraged by other network systems to allow networks and security aspects that rely credential information to support a different proprietary system that does not support Active Directory™ (e.g., iPad™). Upon completion of AAA procedures, client 210 is permitted access to network resources 270 via access points 220.

In some embodiments, multiple authentication steps can occur prior to allowing client 210 to access network resources 270. For example, in a multi-factor authentication environment, client 210 can be authenticated based on different credentials or identifiers. AAA management servers 240 and 250 can employ one or more of (but are not limited to) Extensible Authentication Protocol (EAP) and developments thereof (e.g., PEAP [Protected Extensible Authentication Protocol], EAP-TLS [Tunnel Layer Security], EAP-TTLS [Tunneled Transport Layer Security], EAP-FAST [Flexible Authentication via Secure Tunneling]), Microsoft Challenge-Handshake Authentication Protocol (MS-CHAP [v1 and v2]), device- or network identifier-based authentication (e.g., media access control [MAC] address, internet protocol address, serial number, et cetera), Kerberos, AAA management protocols such as Remote Authentication Dial In User Services (RADIUS), Java Authentication and Authorization Service (JAAS), non-encrypted or encrypted keys or tokens, key sharing, external device authentication (e.g., USB-key based unlock, smart cards), local or nonlocal passwords, network keys, biometrics, time-based approaches, and other single- or multi-factor identification or authentication techniques and technologies used in conjunction therewith. In some embodiments, additional devices collocated with or remote to AAA management servers 240 and 250 can be utilized to effect some of the security or authentication techniques described. Various embodiments associated with the innovations herein can use Active Directory™ for aspects relating to security as well as administration.

In some embodiments, a multi-factor authentication can employ a device authentication. For example, client 210 associate or manage a digital certificate to verify itself as a device authorized to utilize network resources 270. The device authentication can employ WPA2-802.1X (EAP-TLS) via one or both of AAA management servers 240 and 250. In some embodiments, client 210 can have an 802.1X supplicant configured to facilitate the device authentication. In some embodiments, AAA management server 240 is dedicated to handling one factor of the multi-factor authentication, and specifically administers the device authentication. Other factors can be managed by AAA management server 250.

In some variants of the above embodiments, a subsequent authentication in the multi-factor authentication can be a user authentication. Once a device authentication is completed (e.g., in communication with AAA management server 240), a user at client 210 can authenticate with user credentials. In some embodiments, a visible captive portal is displayed on client 210, permitting the user to enter credentials. In one or more embodiments, the captive portal can be launched and administered via a web browser, and transmissions are restricted exclusively to that required for the captive portal. These transmissions can be secured using cryptographic protocols such as Transport Security Layer or Secure Sockets Layer. Once acceptable user credentials are presented, client 210 has now been multi-factor authenticated by both device and user, and is permitted to access network resources 270.

In some embodiments, the captive portal can leverage server-side (or other) resources to provide or emulate function that is not resident or native to a proprietary device. In some embodiments, a third party supplicant can enable more robust and flexible multi-factor authentication. For example, some devices lack the ability to perform dual 802.1X authentications, or employ vendor-specific supplicants, limiting their ability to accomplish multi-factor authentication or authenticate at all on some proprietary networks. Accordingly, the captive portal can allow the submission of various inputs that can be utilized on the server-side as if they were authenticated over 802.1X where the client's limitations with respect to native supplicants would otherwise preclude multi-factor authentication of this type.

In some embodiments, network resources 270 can be individual network elements, locations or stored information. In some embodiments, access to a particular resource among network resources 270 can be contextual or dependent upon authentication. For example, in some embodiments, a user can have different credentials that can be presented, with different permissions associated. In some embodiments, additional authentication factors can be employed to access some resources that are not required for others.

Figure 3:
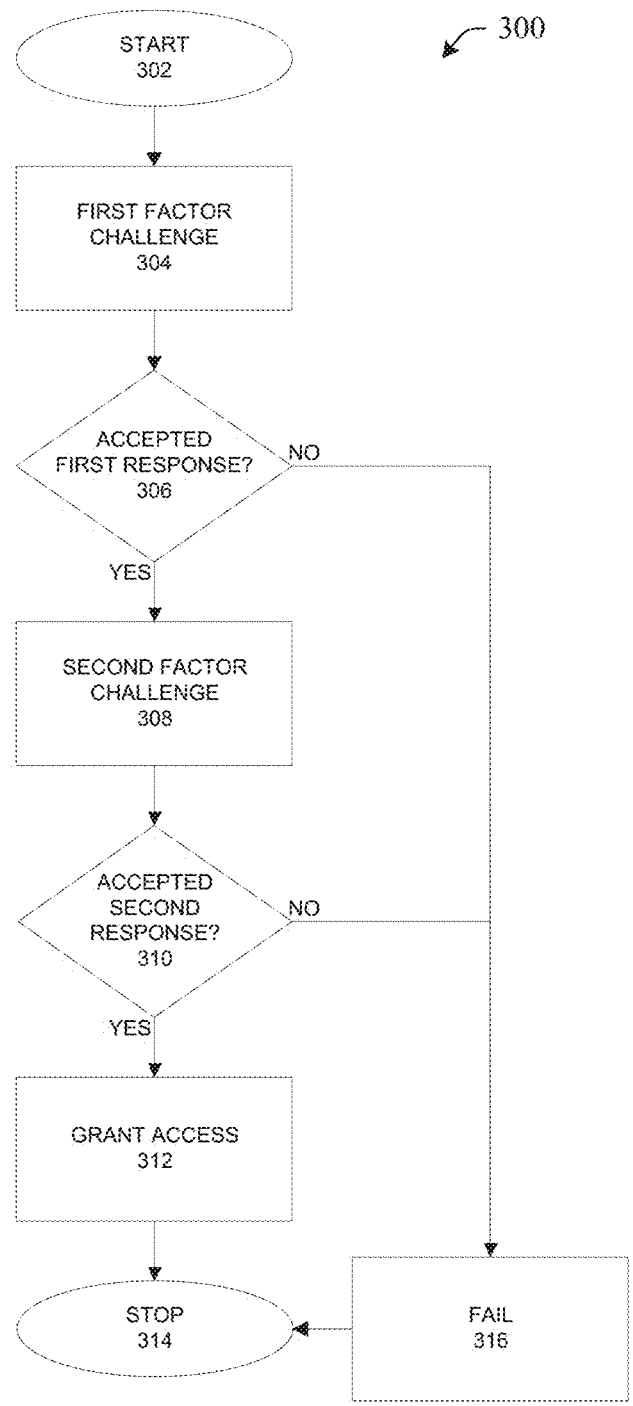
FIG. 3 illustrates a flow diagram of a methodology for gaining access to a network in accordance with some aspects described herein.

Turning now to FIG. 3, a flow diagram of a methodology 300 for gaining access to a network is illustrated. A multi-factor test can be employed to grant access to the network. At 302, the method begins, and proceeds to first factor challenge at 304. In some embodiments, the first factor challenge at 304 can determine a machine identity. For example, a non-exportable public key machine certificate can be employed over 802.1X. The certificate can identify the machine attempting to connect. In some embodiments, the certificate or access control architecture can be pre-configured to load such that a user of a machine performs no action and need not be aware that the machine identification is occurring. In some embodiments, some action must be taken by the user to ensure the machine certificate is presented. In one or more embodiments, an access control server captures the machine certificate and validates it against Active Directory™ or external storage reflecting certificates stored therein. The access control server can also serve to log and manage attempts with respect to at least one authentication factor.

Prior to and during the first factor challenge at 304, all traffic not related to the first factor challenge can be rejected or held until access is granted. A machine will not be permitted to transmit or receive any information not related to the first factor challenge until at least an accepted first response is provided at 306. An accepted first response at 306, in the example above, can include a recognized public key machine certificate affirmatively identifying the machine attempting to connect as one permitted access. If the first response is not accepted at 306, methodology 300 can proceed to failure at 316 and end at 314. As discussed throughout, other alternatives with respect to failed authentication are possible, including providing subsequent attempts to present an accepted response at 306 before failure at 316. If the first response is accepted at 306 in the illustrated multi-factor embodiment, methodology 300 proceeds to 308 and a second factor challenge.

At 308, a second factor challenge provides an opportunity to present an accepted second response at 310. In one or more embodiments, the second factor challenge is only accessible after the first factor challenge is successfully passed (e.g., the second factor challenge is invisible or disallowed until the first factor challenge passed). In some embodiments, the second factor challenge at 308 can involve a secure username and/or password entered prior to granting access at 312. At 310, the username and/or password can be evaluated to determine whether an accepted second response is provided, identifying a user permitted access. If so, methodology 300 proceeds to 312, where access is granted. If not, methodology can proceed to failure at 316. Once again, other alternatives to immediate failure will be appreciated in view of the disclosures herein. At 314, methodology 300 terminates, either after access has been denied, or access is no longer needed (e.g., disconnecting and resetting methodology 300 if access is needed again).

Those skilled in the art can appreciate that the particular identification techniques and order in which those techniques are completed in methodology 300 can vary in different embodiments. In some embodiments, three or more different factor challenges and accepted responses are evaluated prior to granting access. In some embodiments, the order of challenges can be dynamic: Different users and/or machines (or the same user and/or machines at different times, locations, attempts, et cetera) can encounter varying and nonstandard orders for establishing user or machine identities (e.g., machine identity first during one attempt, user identity first during a second attempt). In some embodiments, the number of challenges can also vary for the same access in view of contextual issues. For example, on frequently-threatened access points requiring maximum access control, third and fourth factor challenges can be implemented (e.g., government Common Access Card and a PIN number) at different phases of authentication, and the order in which the challenges are presented can rotate or vary randomly during night hours when fewer information technology personnel are monitoring resources. In the same example, on more secure access points, only first and second factor challenges are used to grant access. Variants of such techniques can be appreciated by those skilled in the art. In some embodiments, other secure authentication techniques such as biometric scans can be employed.

One or more aspects of methodology 300 can be implemented in a device-agnostic fashion. For example, standard, embedded, or generic protocols, data types, modules and functions can be employed to ensure all devices with appropriate connection capabilities (e.g., wireless radios, infrared ports) are able to authenticate in accordance with aspects disclosed herein. In one or more embodiments, the captive portal can be implemented as a webpage that is compatible with browsers supported by all systems permitted on the network. In other embodiments, generic local functions can be used in conjunction with accepted network standards to provide interoperability.

Figure 4:
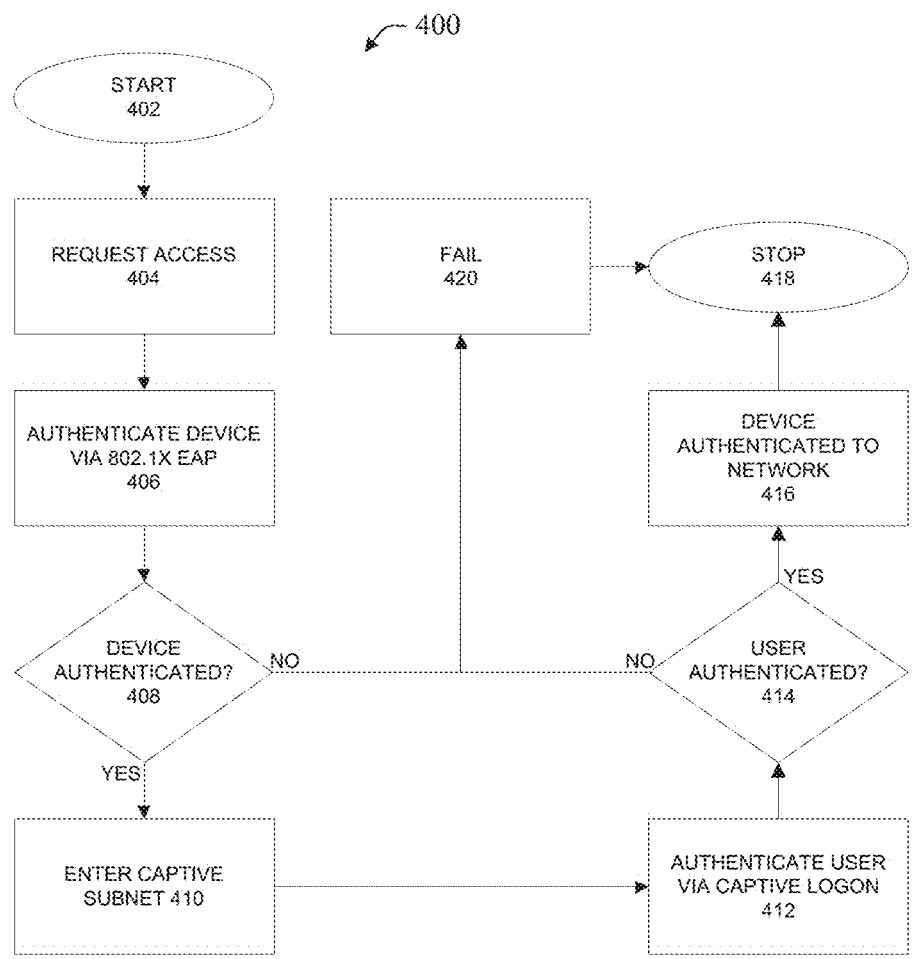
FIG. 4 illustrates a flow diagram of a methodology authenticating a device on a network in accordance with some aspects described herein.

Turning now to FIG. 4, illustrated is a flow diagram of a methodology 400 authenticating a device on a network. At 402, methodology 400 begins and proceeds to request access to the network at 404. After requesting access at 404, the device requesting access can be authenticated via EAP over 802.1X, which in the wireless context can be extended under WPA-2 Enterprise. At 408, the device can be authenticated. Device authentication can be accomplished using a certificate or other means for securely identifying a device. Other examples include pre-installed keys or identifiers residing in device storage, and/or other identifiers firm- or hard-coded to non-writable storage or other hardware. In some embodiments, information exchanged at 408 can be encrypted.

If device authentication fails at 408, methodology 400 can proceed to 420 where the methodology fails and ends at 418. In some embodiments, one more additional attempts can be made at 408 prior to failure at 420. In the event methodology 400 terminates through failure at 420, various embodiments can follow, including some where methodology 400 can immediately restart at 402 or 408, and others where a temporary or permanent bar to restarting methodology 400 is imposed.

If the device is authenticated at 408, the methodology can create or allow entry to a captive subnet at 410. In some embodiments, information exchanged over the subnet can be encrypted. The subnet utilized at 410 permits limited transmission and reception necessary to allow a user to load an interface and submit credentials at 412. Once the subnet is initialized at 410, the methodology proceeds to 412, where a user can authenticate via a captive logon. In some embodiments, the captive logon leverages a resident web browsing capability and loads the authentication screen as a page in the browser. In some such embodiments, the browser can be automatically launched with the captive logon, and in other such embodiments the device can wait for the user to manually load the browser. In embodiments compatible with appropriate protocols, TLS or SSL can be used to provide encryption (in some embodiments, additional layers of encryption) for the user credentials. In one or more embodiments, 802.1X can be employed to provide appropriate protocols and encryption.

After the user enters credentials, the user can be authenticated at 414. If the user is not authenticated, such as when no credentials are provided within a timeout window or unsatisfactory credentials are presented, methodology 400 can proceed to 420, where methodology 400 fails and stops at 418. As discussed throughout, some embodiments may allow multiple login attempts and lock out permanently or temporarily after a series of failures.

If the user is authenticated at 414, multi-factor authentication is accomplished, and the device is authenticated to the network at 416. The device leaves the captive subnet, and, in some embodiments, the subnet is shut down or removed until needed again. In other embodiments, the subnet exists, logically or on its own hardware, perpetually. At 418, methodology 400 stops, either after completing multi-factor authentication or failing to complete multi-factor authentication. In either case, at or after 418, the device, can remain in its current state of connectivity and either disconnect or attempt to authenticate again via methodology 400.

As with other methodologies and techniques involving systems disclosed herein, it is understood that the order of authentications, as well as the number and type of authentications performed, is flexible and alterable in various embodiments under the scope and spirit of the disclosures herein. It is only for the sake of brevity that methodology 400 sets forth two authentication factors in a particular order. While such embodiments can be particularly beneficial in certain environments, these and other embodiments should not be seen as limiting in scope, but rather providing manageable illustrations suggesting the spirit of the innovation.

Figure 5:
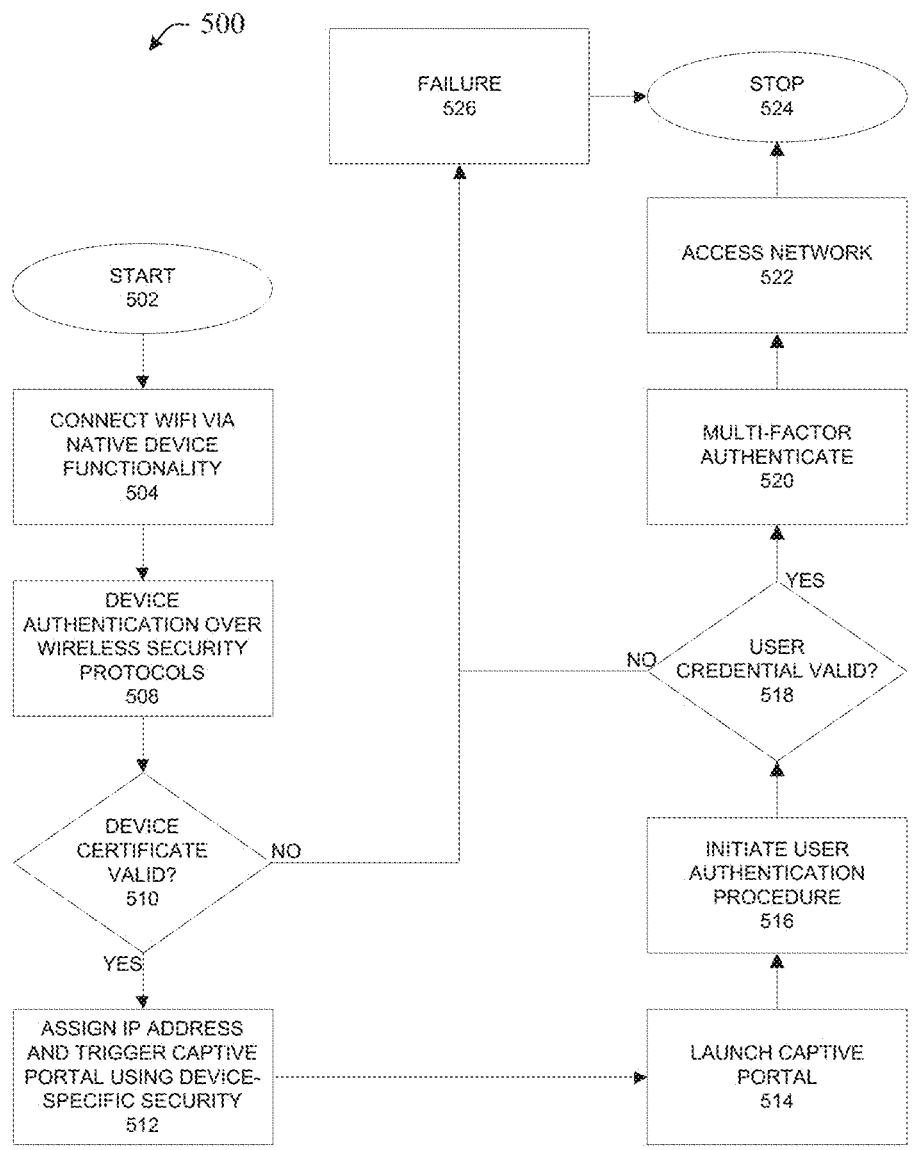
FIG. 5 illustrates a flow diagram of a methodology for accessing a wireless network in accordance with some aspects described herein.

Turning now to FIG. 5, illustrated is a flow diagram of a methodology 500 for accessing a wireless network. Methodology 500 begins at 502, and proceeds to connect via WiFi using native device functionality. By employing flexible standards and security protocols, as well as native and/or embedded modules, a variety of proprietary network connectivity utilities can be employed. For example, devices using variants of Windows™, OS X™, iOS™, Android™, UNIX/LINUX, DOS, and various other networking, mobile or proprietary operating systems that include functionality compliant with WiFi standards are all able to associate with a wireless signal and authenticate to the network.

After the WiFi association occurs using the device's resident function at 504, device authentication can occur over, for example, wireless security or other secure communication standards, algorithms and protocols to again allow a device-agnostic approach to authentication. For example, if devices provision an identity certificate, the certificate can be stored in accordance with the individual device and operating system policies. This certificate can be authenticated over 802.1X utilizing WPA2-Enterprise (EAP-TLS, PEAP, EAP-FAST, and other EAP-types or -encapsulations). Accordingly, net-capable devices can easily connect and authenticate regardless of their operating system or user preferences. In instances involving organizationally-provided devices (e.g., Blackberry™ phones or Nexus™ tablets), there can be relative certainty that even such devices running proprietary or modified operating system versions will be interoperable with organizational networks.

In the illustrated embodiment, at 510 a device certificate, managed over network communication protocols, is checked to determine whether the device can be authenticated to the network. In some (but not necessarily all) embodiments, the certificate being managed is not managed over the network that the device is seeking to access, e.g., such as if the device is constrained to a single hardware contact point, subnet, captive portal, or other "walled garden" in accordance with disclosures herein. If the device is authenticated at 508-510, methodology 500 can advance toward the second authentication of the multi-factor authentication at 512-518. If not, methodology 500 proceeds to failure at 526 and terminates at 524. Various techniques for managing failed authentication attempts are discussed throughout, and those skilled in the art can appreciate others not expressly recited.

After the device is authenticated at 510, at 512 the device can be assigned an internet protocol (IP) address on the network. In some embodiments, this IP address can be a "production" (normal access) address, but is specially managed until multi-factor authentication is complete. Management can be as simple as a web-browser redirect, or as complex as a layered series of permissions, and logical and/or physical barriers to access beyond the authentication process. In some embodiments, an IP address assigned can be a temporary IP address that is changed subsequent to multi-factor authentication. In embodiments employing a temporary IP address, the address(es) can be drawn from an address block specifically dedicated to devices that have not yet completed a user authorization, and that address block can have limited permissions or additional restrictions not imposed on one or more other address blocks. As with the aspects described supra, management of an assigned IP address and collateral needs associated therewith can be handled by native device capabilities in accordance with the hardware and software of various proprietary platforms.

Simultaneously at 512, a captive portal is triggered. In some embodiments, only specific IP addresses are permitted to access the captive portal. In alternative embodiments, devices identified by means other than IP address are permitted to access the captive portal. In still other embodiments, all devices can access the captive portal, but cannot utilize it, or return no results from attempting to utilize it, unless the certificate authentication at 510 is successful. The captive portal and connections required can utilize device specific security where necessary (e.g., WLAN controller sends dynamic host configuration protocol request for MAC™ OS X™ or WLAN subnet) to provide the captive portal. At 514, the captive portal is launched, either in a web browser or utilizing other generic or device-specific interfaces, functions and libraries operable on the device attempting to authenticate. In some embodiments, the captive portal can have different versions programmed using said device-specific interfaces, functions and libraries, and detect the device type or use the device authentication to identify which version to utilize. In other embodiments, a generic captive portal is employed that is usable with all authorized devices. At 516, the user authentication procedure is initiated. The user authentication procedure can be as simple as a single prompt for one input, or as complicated as a series of prompts or screens requiring multiple inputs (e.g., username, account number, password, PIN number, CAPTCHA-type test).

At 518, the user credentials (and any other inputs provided) are evaluated to determine if a valid credential has been presented. If not, methodology 500 proceeds to fail at 526 and stops at 524. As with the device authentication, multiple attempts and treatments for failures are disclosed herein. Notwithstanding, different techniques or alternate means can be used to address failures at different parts of methodology 500 or others described herein. For example, an invalid certificate or failure to present a certificate can automatically result in failure and temporary disallowance from re-attempts, whereas an invalid user credential can allow two additional attempts before disallowing the device associated with the attempting user.

If the credential is determined to be valid at 518, methodology 500 proceeds to 520, where the multi-factor authentication is verified and completed. At 522, network access is provided, which can include reassignment of IP addresses, removal from or of subnets and/or captive portals, increased permissions, and other changes. At 524, methodology 500 stops, with no further authentication required either due to success or failure.

Figure 6B:
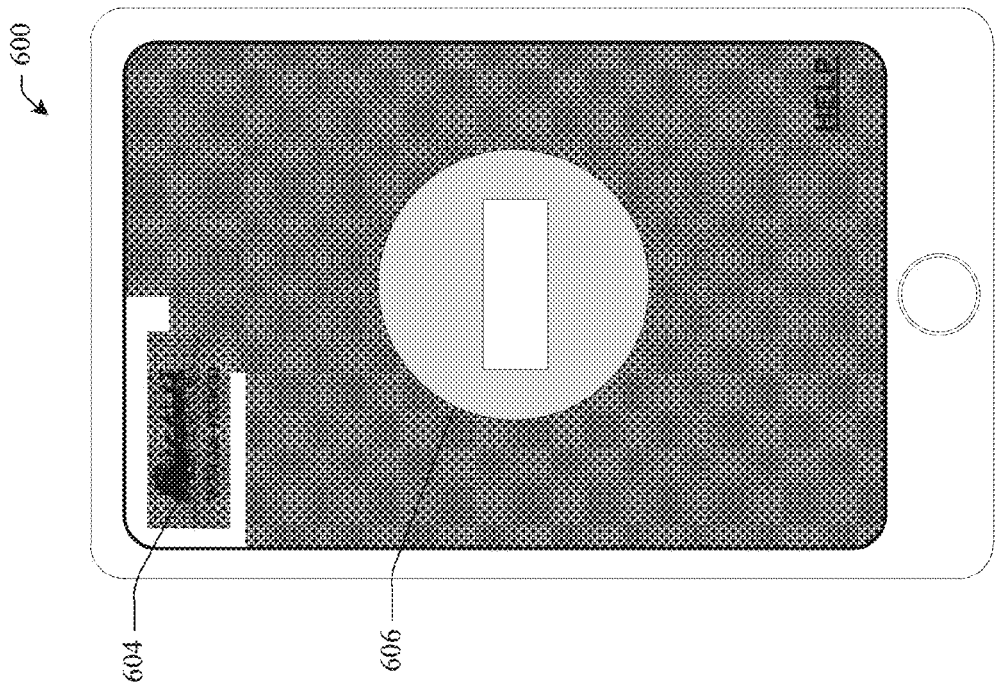
FIGS. 6A and 6B illustrate a sample user authentication interface.
Figure 6A:
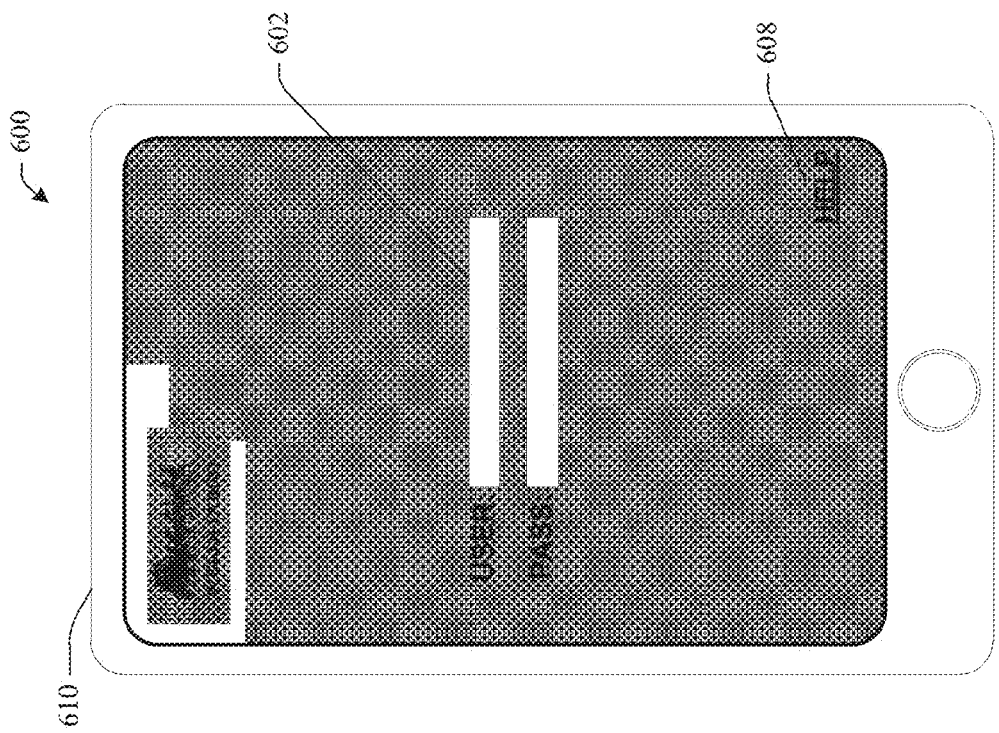

Turning now to FIGS. 6A and 6B, illustrated is a sample user authentication interface 600. In some embodiments, authentication interface 600 is the visible, client-end of a captive portal. Device 610 can load the captive portal, either in a web browser or in a standalone fashion using native or generic functionality. Device 610's keyboard and other input function (e.g., touchscreen/soft keyboard that displays after selecting input field) can be used to provide input to input field(s) 602. If device 610 is connected to a traditional, external keyboard, the same can be used to populate input fields 602. In this way, authentication interface 600 is not sensitive to a particular proprietary platform during input of a manual authentication factor.

Where authentication interface 600 is a captive portal, various network components can limit traffic to and from device 610 to that exclusively required for the use of authentication interface 600. For example, image 604 and image 606 can be accessed and downloaded, but no other images are accessible by any protocol over the connection until the authentication interface 600 has been successfully passed by the presentation of acceptable credentials. In another example, element 608 (e.g., hyperlink or button) can link to an additional screen or popup, or change the display to provide help information, and traffic associated with which can be permitted. However, help information not expressly provided through the captive portal is disallowed if device 610 has not authenticated.

FIG. 6A illustrates an example of authentication interface 600 prior to an authentication attempt or before authentication interface 600 has encountered a maximum number of failed attempts. FIG. 6B illustrates an example of authentication interface 600 subsequent to a maximum number of failed attempts, at which time the user is prevented, temporarily or permanently, from re-attempting the authentication process by entering credentials.

Figure 7:
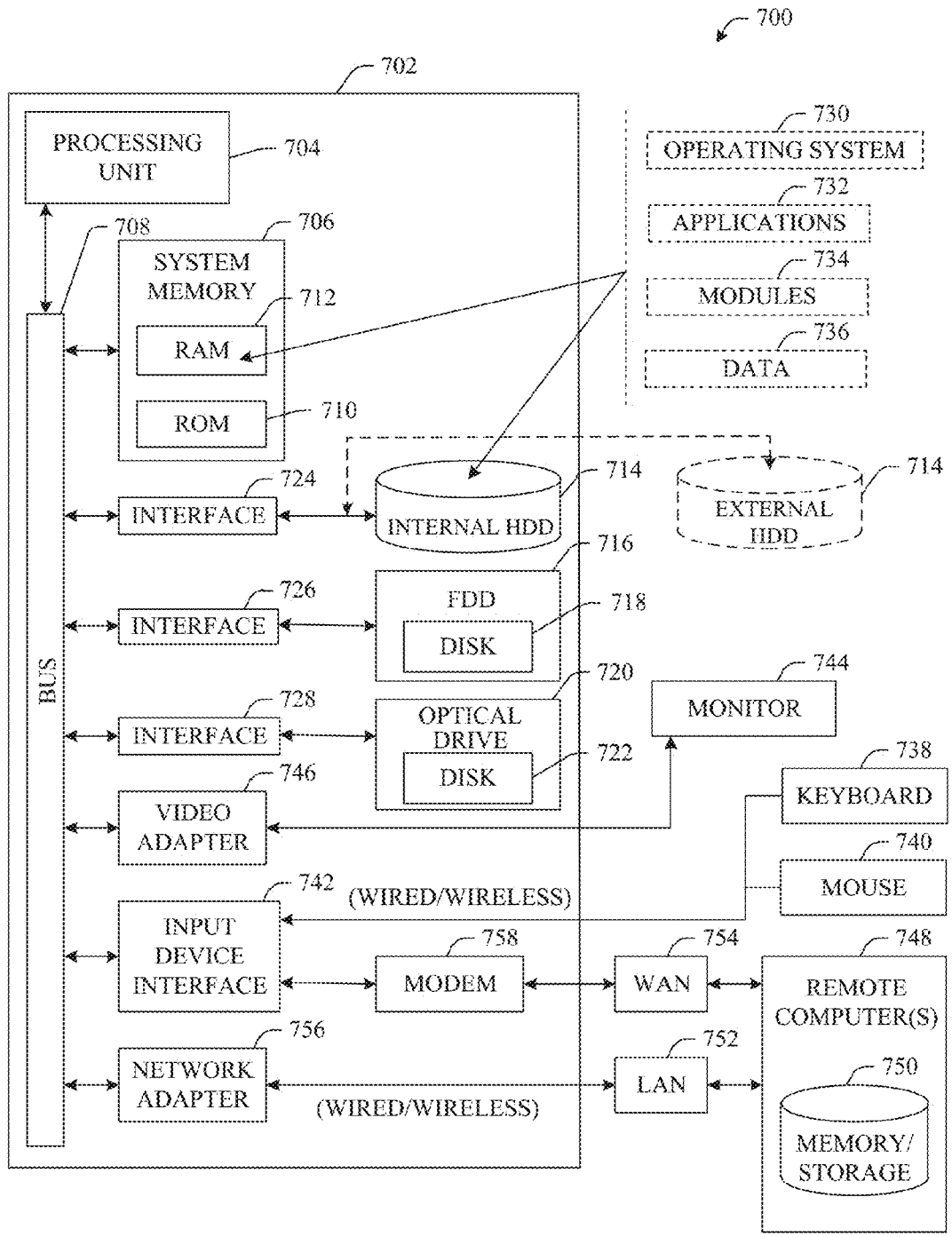
FIG. 7 illustrates a brief general description of a suitable computing environment wherein the various aspects of the subject innovation can be implemented.

Now with reference to FIG. 7, the exemplary environment 700 for implementing various aspects of the innovation includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA). Alternatively or in addition, an external hard disk drive 715 may also be configured for external use in a suitable chassis (not shown), a magnetic disk drive, depicted as a floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drives 714, 715 magnetic disk drive 716 and optical disk drive 720 can be connected to the system bus 708 by a hard disk drive interface 724, a magnetic disk drive interface 726 and an optical drive interface 728, respectively. The interface 724 for external drive implementations can include Universal Serial Bus (USB), IEEE 1394 interface technologies, and/or other external drive connection technologies.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and system memory 706, including an operating system 730, one or more application programs 732, other program modules 734 and program data 736. All or portions of the operating system, applications, modules, and/or data can also be cached in the RAM 712. It is appreciated that the innovation can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers, etc.

The computer 702 may operate in a networked environment using logical connections via wired and/or wireless communications to one or more remote computers, depicted as remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which may connect to a global communications network, e.g., the Internet.

When used in a LAN networking environment, the computer 702 is connected to the local network 752 through a wired and/or wireless communication network interface or adapter 756. The adapter 756 may facilitate wired or wireless communication to the LAN 752, which may also include a wireless access point disposed thereon for communicating with the wireless adapter 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 via the serial port interface 742 as depicted. It should be appreciated that the modem 758 can be connected via a USB connection, a PCMCIA connection, or another connection protocol. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, n etc.) to provide secure, reliable, fast wireless connectivity. A WiFi network can be used to connect computers to each other, to the Internet, and to wired networks (which use IEEE 802.3 or Ethernet).

Figure 8:
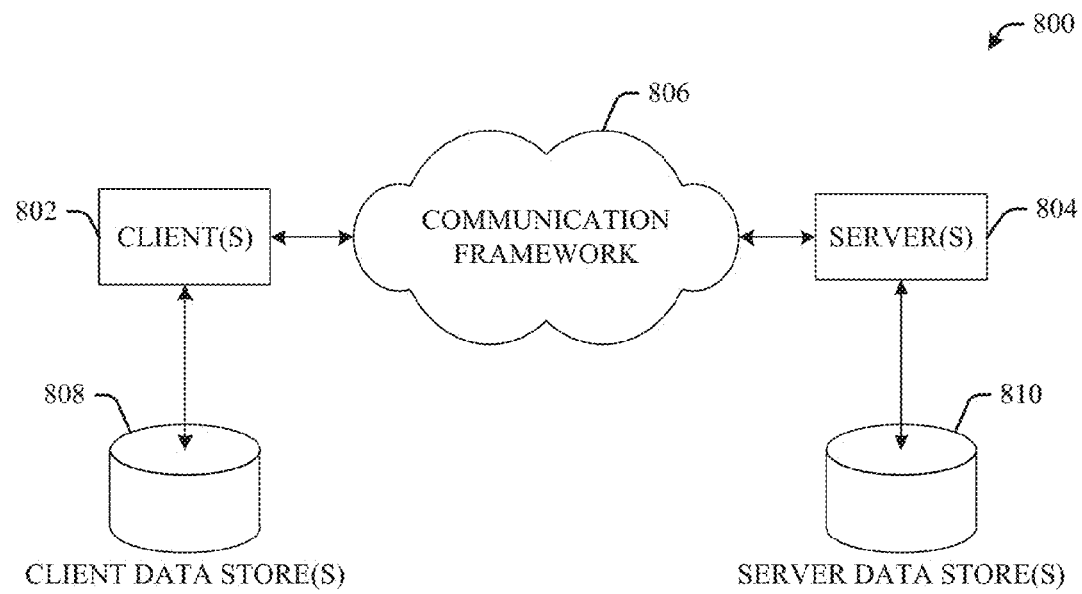
FIG. 8 illustrates a schematic diagram of a client-server computing environment wherein the various aspects of the subject innovation can be implemented.

FIG. 8 is a schematic block diagram of a sample-computing environment 800 that can be employed for practicing aspects of the afore-mentioned methodology. The system 800 includes one or more client(s) 802. The client(s) 802 can be hardware and/or software (e.g., threads, processes, computing devices). The system 800 also includes one or more server(s) 804. The server(s) 804 can also be hardware and/or software (e.g., threads, processes, computing devices). The servers 804 can house threads to perform transformations by employing the components described herein, for example. One possible communication between a client 802 and a server 804 may be in the form of a data packet adapted to be transmitted between two or more computer processes. The system 800 includes a communication framework 806 that can be employed to facilitate communications between the client(s) 802 and the server(s) 804. The client(s) 802 are operatively connected to one or more client data store(s) 808 that can be employed to store information local to the client(s) 802. Similarly, the server(s) 804 are operatively connected to one or more server data store(s) 810 that can be employed to store information local to the servers 804.

What has been described above includes examples of the various aspects and embodiments. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the aggregation of password rules can infer or predict support or the degree of parallelism provided by a machine based on previous interactions with the same or like machines under similar conditions. As another example, touch scoring can adapt to hacker patterns to adjust scoring to thwart successful approaches.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein (or otherwise applied) is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for network authentication, comprising:
   determining, by a system comprising a processor, a device identity based on a first factor challenge output a first time over a WiFi connection in response to an attempt by the device to access the network;
   receiving, by the system, data indicative of a user identity based on a second factor challenge output a first time over a subnetwork after receipt of a successful response to the first factor challenge;
   performing one of:
   denying, by the system, access to the network based on a determination that the data indicative of the user identity is not verified within a threshold number of attempts, or
   granting, by the system, access to the network based on a determination that the data indicative of the user identity is verified within the threshold number of attempts;
   associating, by the system, a subnetwork with the device, the subnetwork restricts transmission and reception by the device prior to successful completion of the second factor challenge, wherein the device is rolled back to the first factor challenge to re-authenticate if a threshold number of attempts at completing the second factor challenge fail,
      wherein upon a successfully completing the first factor challenge the device receives a temporary network IP address and upon successful completion of the second factor challenge the device receives a permanent network IP address; and
   triggering, by the system, a captive portal based on the determining the device identity, wherein the captive portal restricts a view of network traffic not related to an authentication input until the data indicative of the user identity is verified.

2. The method of claim 1, further comprising ignoring, at least temporarily, network traffic not related to the first factor challenge prior to the receipt of the successful response.

3. The method of claim 1, wherein the captive portal is inaccessible to an unidentified device.

4. The method of claim 1, after denying the access to the network, the method further comprising:
   outputting, by the system, the first factor challenge a second time over the WiFi network;
   receiving, by the system, other data indicative of another user identity based on the second factor challenge output a second time after receipt of another successful response to the first factor challenge; and
   performing one of:
   denying, by the system, access to the network based on a determination that the data indicative of the other user identity is not verified within a threshold number of attempts, or
   granting, by the system, access to the network based on a determination that the data indicative of the other user identity is verified within the threshold number of attempts.

5. The method of claim 4, further comprising ignoring, at least temporarily, network traffic not related to the first factor challenge after denying the access to the network and before the receipt of the other successful response to the first factor challenge.

6. The method of claim 4, further comprising triggering, by the system, a captive portal based on determining the device identity a second time, wherein the captive portal restricts a view of network traffic not related to an authentication input until the other user identity is verified.

7. The method of claim 6, wherein the captive portal is inaccessible to an unidentified device.

8. The method of claim 6, further comprising associating, by the system, a subnetwork with the device, the subnetwork restricts transmission and reception by the device prior to successful completion of the second factor challenge output a second time.

9. A system for network authentication, comprising:
- a first authentication component that verifies an identity of a device attempting to access the network;
- a captive portal that is implemented at about the same time as the first authentication component verifies the device identity, wherein the captive portal restricts a view of network traffic not related to the network authentication until the user identity is verified; and
- a second authentication component that, after verification of the identity, sends a request for identification of a user of the device,
- wherein, based on a determination that the second authentication component does not verify the user of the device, the first authentication component re-verifies the identity of the device and the second authentication component sends another request for identification of the user of the device, and
- wherein, based on a determination that the second authentication component verifies the user of the device, the second authentication component grants access to the network.

10. The system of claim 9, wherein the first authentication component verifies the identity based on a match between the identity and a set of credentials recognized by the first authentication component.

11. The system of claim 9, wherein the first authentication component verifies the identity of the device over a WiFi connection and the second authentication component verifies the user identity over a subnetwork that restricts transmission and reception by the device until the second authentication component verifies the user identity.

12. The system of claim 9, wherein the captive portal is inaccessible to an unidentified device.

13. The system of claim 9, wherein the second authentication component grants access to the network based on a determination that the user identity is verified within a threshold number of attempts.

14. The system of claim 9, wherein the second authentication component denies access to the network based on a determination that the user identity is not verified within a threshold number of attempts.

15. A computer-readable storage device storing executable instructions that, in response to execution, cause a system comprising a processor to perform operations, comprising:
- verifying a device identity based on a reply to a first authentication request;
- receiving data indicative of a user identity in reply to a second authentication request, wherein the second authentication request is output after verification of the device identity in response to the first authentication request;
- verifying the device identity again based on a reply to a third authentication request, wherein the third authentication request is output based on the user identity not being verified within a predetermined number of attempts, and wherein the first authentication request and the third authentication request are similar authentication requests;
- receiving other data indicative of the user identity in reply to a fourth authentication request, wherein the fourth authentication request is output after verification of the device identity in response to the third authentication request, and wherein the second authentication request and the fourth authentication request are similar authentication requests;
- triggering a captive portal based on determining the device identity, wherein the captive portal restricts a view of network traffic not related to an authentication input until data indicative of the user identity is verified; and
- selectively granting access to the network based on a determination that the user identity is verified.

16. The computer-readable storage device of claim 15, wherein the first authentication request and the third authentication request are communicated over a WiFi connection.

17. The computer-readable storage device of claim 15, wherein the second authentication request and the fourth authentication request are communicated over a subnetwork.

\* \* \* \* \*